(12) United States Patent
Sidlosky et al.

(10) Patent No.: US 8,131,424 B2
(45) Date of Patent: Mar. 6, 2012

(54) METHODS AND SYSTEMS FOR CALCULATING YAW GAIN FOR USE IN CONTROLLING A VEHICLE

(75) Inventors: David M. Sidlosky, Beverly Hills, MI (US); Christopher A. Kinser, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1086 days.

(21) Appl. No.: 12/014,970

(22) Filed: Jan. 16, 2008

(65) Prior Publication Data
US 2009/0182476 A1 Jul. 16, 2009

(51) Int. Cl.
*B60W 30/02* (2006.01)
(52) U.S. Cl. ............................ 701/41; 701/72
(58) Field of Classification Search ............ 701/41
See application file for complete search history.

(56) References Cited

U.S. PATENT DOCUMENTS 4,441,572 A * 4/1984 Ito et al. ............... 180/415
(Continued)

FOREIGN PATENT DOCUMENTS
DE 19651760 A1 6/1997

OTHER PUBLICATIONS

Office Action dated Sep. 14, 2010, issued in German Patent Application No. 102009004415.9.

*Primary Examiner* — Shelley Chen
(74) *Attorney, Agent, or Firm* — Ingrassia Fisher & Lorenz, P.C.

(57) ABSTRACT

A method for calculating a yaw gain for use in controlling a vehicle includes the steps of obtaining a steer angle of the vehicle, obtaining a vehicle speed, determining an adjustment factor for a baseline steering geometry equation, obtaining vehicle understeer gradient as a function of lateral acceleration, and calculating the yaw gain. The adjustment factor is determined based at least in part on the turn radius. The yaw gain is calculated based at least in part on the vehicle speed, the steer angle, the vehicle understeer gradient, and the adjustment factor.

20 Claims, 6 Drawing Sheets

U.S. PATENT DOCUMENTS

| | | | |
|---|---|---|---|
| 4,666,013 A * | 5/1987 | Shibahata et al. | 180/421 |
| 4,984,646 A * | 1/1991 | Sano et al. | 180/402 |
| 5,402,341 A * | 3/1995 | Liubakka et al. | 701/42 |
| 5,700,073 A * | 12/1997 | Hiwatashi et al. | 303/146 |
| 5,850,616 A * | 12/1998 | Matsuno et al. | 701/82 |
| 6,074,020 A * | 6/2000 | Takahashi et al. | 303/146 |
| 6,092,882 A * | 7/2000 | Matsuno | 303/146 |
| 6,155,655 A * | 12/2000 | Matsuno | 303/140 |
| 6,208,929 B1 * | 3/2001 | Matsuno et al. | 701/89 |
| 6,219,609 B1 * | 4/2001 | Matsuno et al. | 701/72 |
| 6,553,293 B1 * | 4/2003 | Hac | 701/42 |
| 2005/0267683 A1 * | 12/2005 | Fujiwara et al. | 701/301 |
| 2006/0259225 A1 * | 11/2006 | Ono et al. | 701/82 |
| 2007/0213902 A1 * | 9/2007 | Shin et al. | 701/42 |
| 2009/0192676 A1 * | 7/2009 | Sidlosky et al. | 701/41 |
| 2010/0066515 A1 * | 3/2010 | Shimazaki et al. | 340/435 |

* cited by examiner

METHODS AND SYSTEMS FOR CALCULATING YAW GAIN FOR USE IN CONTROLLING A VEHICLE

TECHNICAL FIELD

The present invention generally relates to the field of vehicles and, more specifically, to methods and systems for calculating a yaw gain for use in controlling a vehicle.

BACKGROUND OF THE INVENTION

Many vehicles today include stability control systems that improve a vehicle's handling. Vehicle stability control systems typically use a means for determining a driver's intended vehicle path when providing stability control to the vehicle. A driver's intended vehicle path can be determined by calculating a yaw gain using parameters such as a vehicle speed and a desired road-wheel angle, which is the driver's hand-wheel angle divided by a steering gear ratio. The yaw gain then can be used to calculate a steady state yaw rate, which can in turn be used to calculate a steady state lateral velocity and, hence, determine a driver's intended vehicle path.

Typically, such vehicle stability control system calculations rely upon an approximate representation of steering geometry defined by Equation 1 below:

$$\delta = \frac{L}{R} + K_u a_y \qquad \text{(Equation 1)}$$

In Equation 1, $\delta$ represents a vehicle road wheel angle, L represents a wheelbase of the vehicle, R represents a turn radius of the vehicle, $K_u$ represents a vehicle understeer gradient (namely, a measure of the vehicle's tendency to "understeer" during a turn, which occurs when a circular path of the vehicle's motion during the turn has a larger diameter than a circular path indicated by a direction in which the vehicle's road wheels are pointed), and $a_y$ represents a vehicle lateral acceleration. Equation 1, which is commonly referenced in the literature, is based on an assumption that the turn radius is much larger than the wheelbase and that the steer angles are small, so that small angle simplifications can be used, such as the arc tangent of an angle being equal to the angle.

Most vehicle stability control methods and systems today rely upon parameters calculated using Equation 1 above. For example, values obtained from Equation 1 are often used to calculate a yaw rate and a yaw gain for the vehicle in accordance with Equation 2 and Equation 3 below:

$$\Omega = a_y/V_{ref} \qquad \text{(Equation 2)}$$

$$\Omega_g = \Omega/\delta \qquad \text{(Equation 3)}$$

In Equations 2 and 3, $\Omega$ represents a yaw rate of the vehicle, $V_{ref}$ represents a velocity of the vehicle, and $\Omega_g$ represents a yaw gain. The yaw rate and the yaw gain are typically utilized as parameters for use in controlling steering of the vehicle, for example in controlling various actions of an electronic stability control system of the vehicle. Specifically, the yaw gain is typically used to calculate a steady-state value for the yaw rate, which in turn is used in controlling one or more steering actions, for example of an electronic stability control system of the vehicle.

While such control methods and systems today may be quite accurate when a vehicle's turn radius is significantly larger than the vehicle's wheelbase, they are more limited when the turn radius is not significantly larger than the wheelbase. For example, during tight turning maneuvers, reliance on the approximations inherent in Equation 1 above may result in less than optimal accuracy.

Accordingly, it is desired to provide improved methods, systems, and programs for calculating a yaw gain for use in controlling a vehicle, particularly in situations when the turn radius is not significantly larger than the wheelbase, for example during tight turning maneuvers. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for calculating a yaw gain for use in controlling a vehicle is provided. The method comprises the steps of obtaining a turn radius of the vehicle, obtaining a vehicle speed, determining an adjustment factor for a baseline steering geometry equation, and calculating a yaw gain. The adjustment factor is determined based at least in part on the turn radius. The yaw gain is calculated based at least in part on the turn radius, the vehicle speed, and the adjustment factor.

In accordance with another exemplary embodiment of the present invention, a program product for calculating a yaw gain for use in controlling a vehicle is provided. The program product comprises a program and a computer-readable signal-bearing media. The program is configured to at least facilitate obtaining a turn radius of the vehicle, obtaining a vehicle speed, determining an adjustment factor for a baseline steering geometry equation, and calculating the yaw gain. The adjustment factor is determined based at least in part on the turn radius. The yaw gain is calculated based at least in part on the turn radius, the vehicle speed, and the adjustment factor.

In accordance with a further exemplary embodiment of the present invention, a system for controlling a steering action of a vehicle is provided. The system comprises a first sensing device, a second sensing device, and a processor. The first sensing device is configured to sense the road wheel angle of the vehicle. The second sensing device is configured to sense a vehicle speed. The processor is configured to at least facilitate determining an adjustment factor for a baseline steering geometry equation, calculating a yaw gain, and controlling a vehicle action. The adjustment factor is determined based at least in part on the turn radius. The yaw gain is calculated based at least in part on the turn radius, the vehicle speed, and the adjustment factor. The vehicle action is controlled based at least in part on the yaw gain.

DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
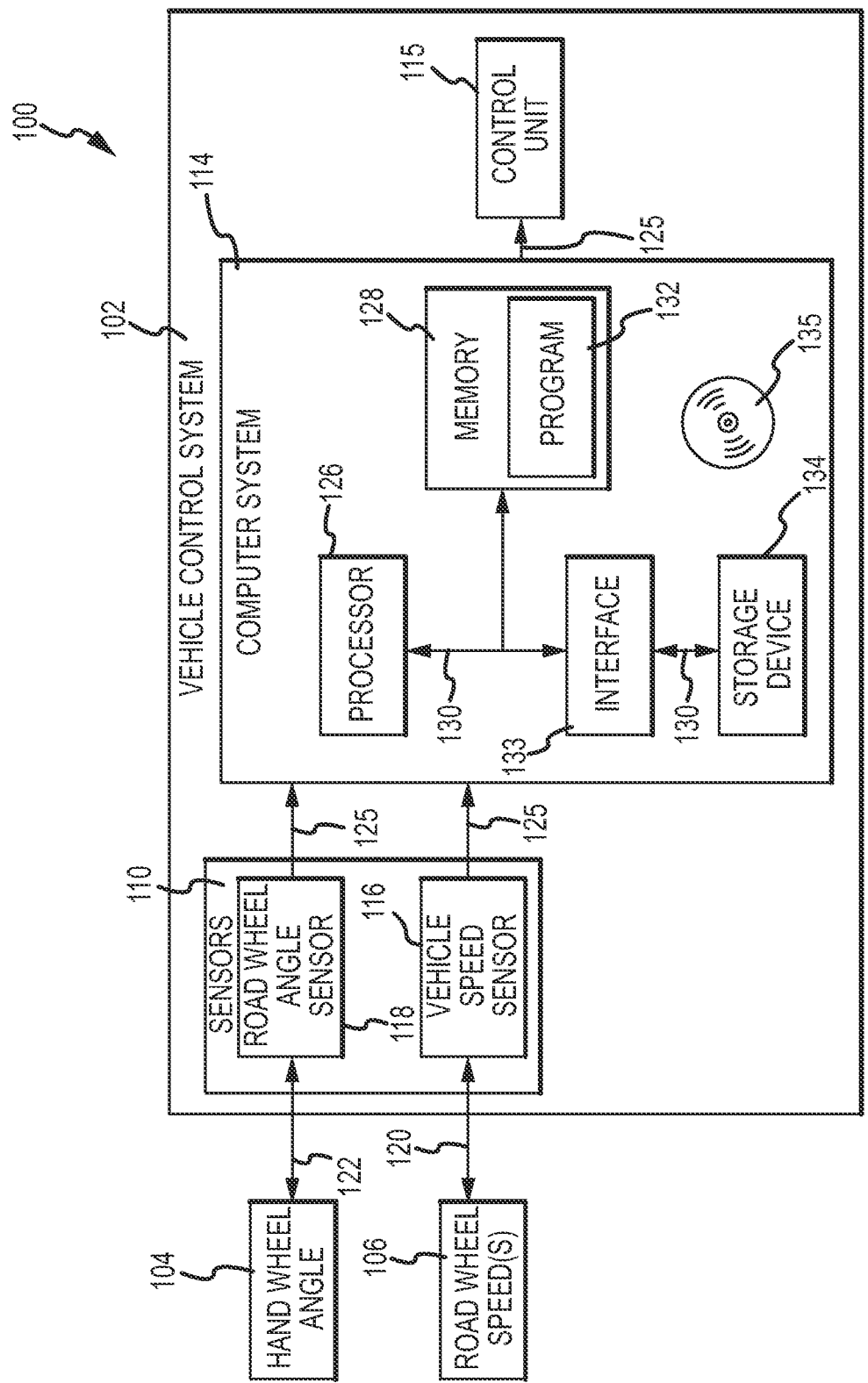
FIG. 1 is a functional block diagram showing a portion of a vehicle, including a steering control system, in accordance with an exemplary embodiment of the present invention.

FIG. 1 is a functional block diagram of a portion of a vehicle 100, including a vehicle control system 102, in accordance with an exemplary embodiment of the present invention. The vehicle control system 102 is depicted in FIG. 1 along with a hand wheel angle 104 and one or more road wheel speeds 106. The hand wheel angle 104 can be obtained via one or more sensors coupled to a hand wheel of the vehicle, or via other techniques. Similarly, the road wheel speeds 106 can be obtained via one or more sensors coupled to one or more road wheels of the vehicle, or via other techniques. In one preferred embodiment, the vehicle control system 102 comprises an electronic stability control system. The various blocks depicted in FIG. 1 may be realized in any number of physical components or modules located throughout the vehicle 100 or the vehicle control system 102. For example, in various embodiments, the vehicle control system 102 may include a number of electrical control units, computer systems, and components other than those shown in FIG. 1.

As shown in FIG. 1, the vehicle control system 102 includes a plurality of sensors 110, a computer system 114, and a control unit 115. The sensors 110 include a vehicle speed sensor 116 and a road wheel angle sensor 118. The vehicle speed sensor 116 receives a first input 120 from the road wheel speeds 106, and the road wheel angle sensor 118 receives a second input 122 from the hand wheel angle 104.

In a preferred embodiment, the first input 120 includes information that can be used in determining one or more road wheel speeds 106 of one or more road wheels of the vehicle. The road wheel speeds 106 can then be used to derive a vehicle speed for the vehicle 100, for example using techniques known in the art. It will be appreciated that in certain embodiments the vehicle speed may also be ascertained using other techniques known in the art.

Also, in a preferred embodiment, the second input 122 includes information as to the hand wheel angle 104 or that can be used to ascertain the hand wheel angle 104 pertaining to an angle or position of the hand wheel. The hand wheel angle 104 can then be used to derive a road wheel angle for one or more of the road wheels, for example using techniques known in the art. It will be appreciated that in certain embodiments the road wheel angle may also be ascertained using other techniques known in the art.

In certain embodiments, the road wheel angle sensor 118 and the vehicle speed sensor 116 may be disposed elsewhere in or around the vehicle 100, and/or may be coupled to vehicle components other than those depicted in FIG. 1. In addition, in certain embodiments, the sensors 110 may include any number of various other different types of sensors or similar devices.

As depicted in FIG. 1, the computer system 114 is coupled to the sensors 110 via a vehicle communications bus 125, and receives information therefrom. The computer system 114 is also coupled to the control unit 115 via the vehicle communications bus 125. The computer system 114 is configured to calculate one or more parameters, such as a yaw gain or a yaw rate, based at least in part on the information obtained from the sensors 110, and to cause the control unit 115 to control one or more vehicle control functions in a specific manner that is based at least in part upon the values of the one or more vehicle parameters. In addition, the computer system 114 may also receive and process information from other vehicle sensors, modules, or other devices (not depicted in FIG. 1).

In the depicted embodiment, the computer system 114 includes a processor 126, a memory 128, a computer bus 130, an interface 133, and a storage device 134. The processor 126 performs the computation and control functions of the computer system 114, and may comprise any type of processor or multiple processors, single integrated circuits such as a microprocessor, or any suitable number of integrated circuit devices and/or circuit boards working in cooperation to accomplish the functions of a processing unit. During operation, the processor 126 executes one or more programs 132 preferably stored within the memory 128 and, as such, controls the general operation of the computer system 114.

The memory 128 stores a program or programs 132 that executes one or more embodiments of a vehicle control process of the present invention, discussed in more detail below. The memory 128 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 128 may be a single type of memory component, or it may be composed of many different types of memory components. In addition, the memory 128 and the processor 126 may be distributed across several different computers that collectively comprise the computer system 114. For example, a portion of the memory 128 may reside on a computer within a particular apparatus or process, and another portion may reside on a remote computer.

The computer bus 130 serves to transmit programs, data, status and other information or signals between the various components of the computer system 114. The computer bus 130 can be any suitable physical or logical means of connecting computer systems and components. This includes, but is not limited to, direct hard-wired connections, fiber optics, and infrared and wireless bus technologies.

The interface 133 allows communication to the computer system 114, for example from a system operator and/or another computer system, and can be implemented using any suitable method and apparatus. It can include one or more network interfaces to communicate to other systems or components, for example the sensors 110 and/or the control unit 115, one or more terminal interfaces to communicate with technicians, and one or more storage interfaces to connect to storage apparatuses such as the storage device 134.

The storage device 134 can be any suitable type of storage apparatus, including direct access storage devices such as hard disk drives, flash systems, floppy disk drives and optical disk drives. In one exemplary embodiment, the storage device 134 is a program product from which memory 128 can receive a program 132 that executes one or more embodiments of a vehicle control process and/or a yaw gain calculation process of the present invention. As shown in FIG. 1, the storage device 134 can comprise a disk drive device that uses disks 135 to store data. As one exemplary implementation, the computer system 114 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 135), and transmission media such as digital and analog communication links. It will similarly be appreciated that the vehicle control system 102 may also otherwise differ from the embodiment depicted in FIG. 1, for example in that the vehicle control system 102 may be coupled to or may otherwise utilize one or more remote computer systems and/or other control systems.

The control unit 115 is coupled to the computer system 114, and receives information therefrom, via the vehicle communications bus 125. Specifically, the control unit 115 uses parameters calculated by the computer system 114, such as a yaw gain, and/or instructions from the computer system 114 based on these parameters, in controlling various actions of the vehicle. In one preferred embodiment, the control unit 115 implements electronic stability control maneuvers based at least in part on a yaw gain calculated by the computer system 114.

Figure 2:
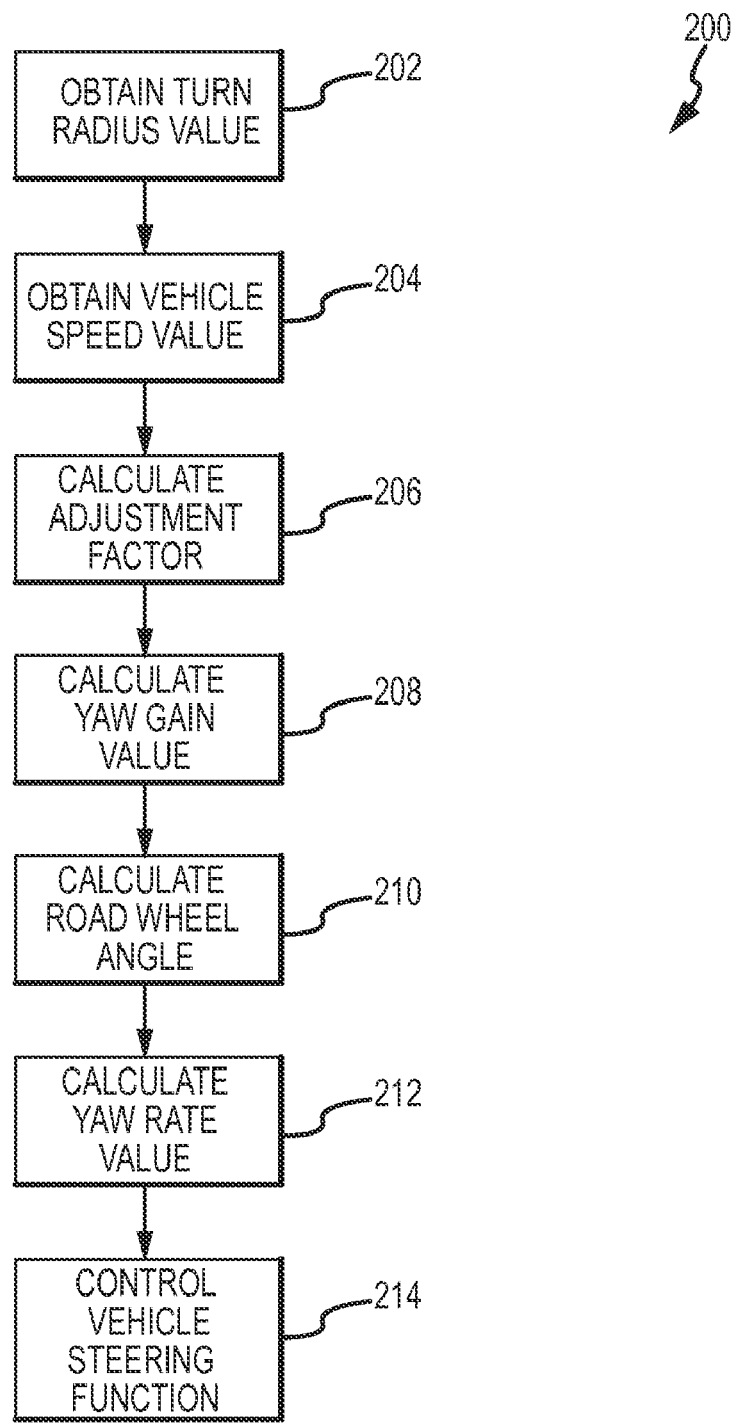
FIG. 2 is a flowchart of a vehicle steering control process that can be implemented in connection with the steering control system of FIG. 1, in accordance with an exemplary embodiment of the present invention.

FIG. 2 is a flowchart of an exemplary embodiment of a steering control process 200 for controlling steering in a vehicle that can be implemented in connection with the vehicle control system 102 of FIG. 1. As depicted in FIG. 2, the steering control process 200 begins with the step of calculating a yaw gain for the vehicle (step 208). In a preferred embodiment, this calculation, and the various other calculations and determinations of the steering control process 200, are performed by the processor 126 of the computer system 114 of FIG. 1.

Also in a preferred embodiment, the yaw gain is calculated in accordance with a recursive algorithm, using an adjustment factor ($F_c$) for a baseline steering geometry equation. An exemplary embodiment of such a recursive algorithm will be discussed in greater detail below in connection with a yaw gain calculation process of FIG. 3. The baseline steering geometry equation utilized in step 208 is based upon the above-referenced Equation 1, which, as described above, can be used in conjunction with other equations (such as the above-referenced Equations 2 and 3) in calculating a yaw gain and a yaw rate for a vehicle. Based on geometric relationships, a more accurate steering geometry equation is provided in Equation 4 below:

$$\delta_f = \tan^{-1}\left(\frac{2\tan\delta_{if}\tan\delta_{of}}{\tan\delta_{if} + \tan\delta_{of}}\right) + K_u V_{ref} \Omega \qquad \text{(Equation 4)}$$

In Equation 4, $\delta_f$ represents a vehicle front road wheel angle, $\delta_{if}$ represents an inner front road wheel angle, $\delta_{of}$ represents an outer front road wheel angle, $K_u$ represents a vehicle understeer gradient, $\Omega$ represents a yaw rate of the vehicle, and $V_{ref}$ represents a velocity of the vehicle. A formula for the adjustment factor ($F_c$) can be derived by combining Equations 1, 3, and 4, resulting in Equation 5 below:

$$F_c = R\delta_f/L \qquad \text{(Equation 5)}$$

In Equation 5, the adjustment factor ($F_c$) is represented as a product of the vehicle turn radius (R) and the front road wheel angle ($\delta_f$), divided by the vehicle wheelbase (L). As such, the adjustment factor ($F_c$) represents an adjustment to the simplified Equation 1, taking into consideration situations in which, for example, the turn radius of the vehicle is not significantly larger than the wheelbase. The use of Equation 5 and the adjustment factor ($F_c$) included therein provides a nonlinear, kinematic model for improved calculation of vehicle parameters under various operating conditions. The use of the adjustment factor ($F_c$) in calculating the yaw gain will be described in greater detail further below in connection with FIG. 3.

Next, a road wheel angle is calculated (step 210). In a preferred embodiment, the road wheel angle is calculated by generating a function that correlates the road wheel angle and a hand wheel angle of the vehicle.

The resulting road wheel angle is then used, along with the yaw gain, to calculate a desired yaw rate of the vehicle (step 212). In a preferred embodiment, the desired yaw rate is calculated in accordance with the above-described Equation 3, specifically, by manipulating Equation 3 to solve for the yaw rate (Ω) by multiplying the yaw gain ($Ω_g$) by the road wheel angle (δ). The yaw rate is then used to control one or more functions of the vehicle (step 214). In a preferred embodiment, the control unit 115 of FIG. 1 uses the desired yaw rate, along with the yaw gain, in controlling one or more functions of an electronic stability control system for the vehicle.

Figure 3:
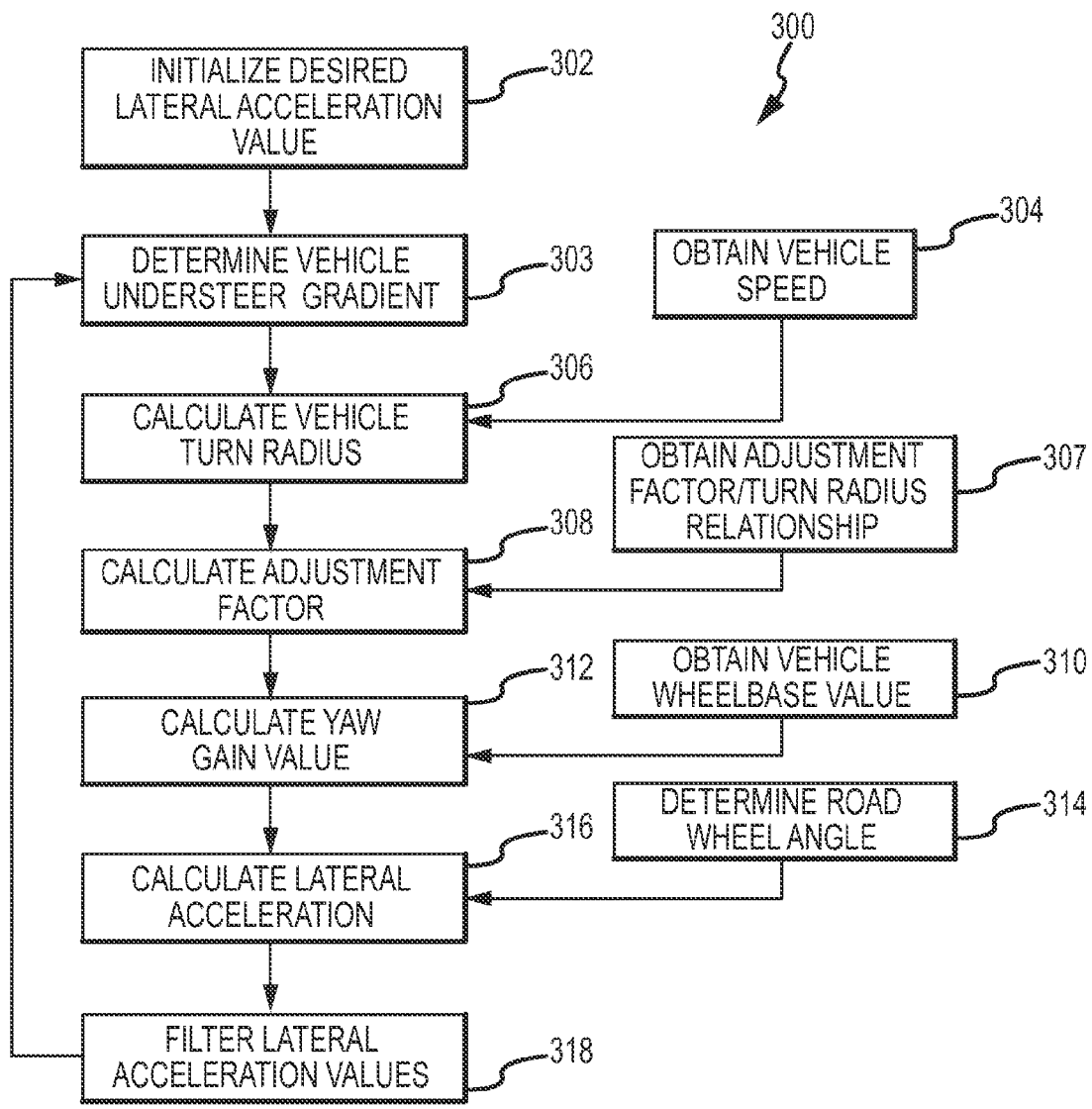
FIG. 3 is a flowchart of a yaw gain calculation process for calculating a yaw gain for use in controlling a vehicle using a recursive algorithm, and that can be implemented in connection with the steering control system of FIG. 1 and the steering control process of FIG. 2, in accordance with an exemplary embodiment of the present invention.

FIG. 3 is a flowchart of an exemplary embodiment of step 208 of the steering control process 200 of FIG. 2, namely the step of calculating the yaw gain. In the depicted embodiment, this yaw gain calculation process 208 uses a recursive algorithm to determine yaw gain, based on the above-described adjustment factor for a baseline steering geometry equation, such as Equation 1.

As depicted in FIG. 3, the yaw gain calculation process 208 begins with the step of initializing a desired lateral acceleration value ($a_{yd}$) (step 302). The initialized desired lateral acceleration value is subsequently used in a recursive algorithm, as set forth below. In a preferred embodiment, the desired lateral acceleration value is initialized as a fraction of an arbitrary lateral acceleration value for the vehicle. In a preferred embodiment, the arbitrary lateral acceleration value (hereafter also referred to as the maximum lateral acceleration value) represents a maximum lateral acceleration value of the vehicle, such as a maximum lateral acceleration capability of the vehicle on dry pavement. In other embodiments, other values for maximum lateral acceleration values can be used for calibrating understeer in the vehicle. For example, the maximum lateral acceleration value can be set equal to a value that is greater than the true maximum lateral acceleration capability of the vehicle on dry pavement if increased understeer control is desired.

In one preferred embodiment, the desired lateral acceleration value is initialized to a value equal to one-tenth of the maximum lateral acceleration value of the vehicle, in accordance with Equation 6 below:

$$a_{yd} = a_{ymax}/10 \quad \text{(Equation 6)}$$

In Equation 6, $a_{yd}$ represents the desired lateral acceleration value, and $a_{ymax}$ represents the maximum lateral acceleration value for the vehicle. It will be appreciated that, in other embodiments, the desired lateral acceleration value may be initialized in accordance with a different equation or other method, for example by using a different fraction, percentage, or other relationship to the maximum lateral acceleration value.

Next, an understeer gradient is determined for the vehicle (step 303). In one preferred embodiment, the understeer gradient is determined as a function of the desired lateral acceleration value, in accordance with Equation 7 below:

$$K_u = f(a_{yd}) \quad \text{(Equation 7)}$$

In Equation 7, $K_u$ represents the understeer gradient. In an alternative embodiment, the understeer gradient ($K_u$) is determined using a look-up table or another type of relationship relating the understeer gradient and the desired lateral acceleration.

A vehicle speed is also obtained (step 304). In a preferred embodiment, the vehicle speed is derived from the one or more road wheel speeds 106 of FIG. 1. It will be appreciated that steps 303 and 304, and various other steps of the yaw gain calculation process 208 of FIG. 3, can be performed simultaneously or in a different order than depicted in FIG. 3 or described herein in connection therewith.

A vehicle turn radius is then calculated (step 306), In a preferred embodiment in which the recursive algorithm repeats with multiple iterations, one or more different intermediate values of turn radius are calculated in each iteration of step 306, until a final vehicle turn radius is calculated in a final iteration of step 306. Regardless of the iteration, the vehicle turn radius is calculated as a function of the vehicle speed and the desired lateral acceleration, in accordance with Equation 8 below:

$$R = V_{ref}^2/a_{yd} \quad \text{(Equation 8)}$$

In Equation 8, R represents the vehicle turn radius, and $V_{ref}$ represents the vehicle speed. In a preferred embodiment, this calculation, and the various other determinations and calculations of the yaw gain calculation process 208 are performed by the processor 126 of the computer system 114 of FIG. 1.

In addition, a relationship between the adjustment factor and turn radius is obtained (step 307). In a preferred embodiment, the relationship between the adjustment factor and turn radius is determined prior to the execution of the yaw gain calculation process 208, is saved in the memory 128 of the computer system 114 of FIG. 1 in the form of a polynomial or a look-up table, and is then retrieved from the memory 128 in step 307. An exemplary embodiment of a process for generating the relationship between the adjustment factor and turn radius (which is preferably conducted prior to the beginning of the yaw gain calculation process 208) will be described further below in connection with FIG. 4.

The relationship between the adjustment factor and turn radius obtained in step 307 is then used, along with the turn radius from step 306, in calculating the adjustment factor (step 308). In one preferred embodiment, the adjustment factor ($F_c$) is calculated in accordance with Equation 9 below:

$$F_c = f(R) \quad \text{(Equation 9)}$$

In Equation 9, $F_c$ represents the adjustment factor, R represents the turn radius, and f represents the relationship between the adjustment factor and turn radius obtained in step 307. Also in a preferred embodiment, in which the recursive algorithm repeats with multiple iterations, one or more different intermediate values of the adjustment factor are calculated in each iteration of step 308, until a final vehicle adjustment factor is calculated in a final iteration of step 308.

The process also includes obtaining a wheelbase for the vehicle (step 310). In a preferred embodiment, the wheelbase is previously stored in the memory 128 of the computer system 114 of FIG. 1, and is subsequently retrieved from the memory 128 during step 310. For example, the wheelbase may be obtained from manufacturing data for the vehicle and stored in the computer system 114 of FIG. 1 prior to the commencement of the yaw gain calculation process 208 for subsequent use during step 310 of the yaw gain calculation process 208.

Next, a yaw gain is calculated (step 312). Specifically, the yaw gain is calculated based on the speed of the vehicle, the adjustment factor, the wheelbase, and the understeer gradient, in accordance with Equation 10 below:

$$Ω_g = V_{ref}/(F_c L + K_u \times V_{ref}^2) \quad \text{(Equation 10)}$$

In Equation 10, $Ω_g$ represents the yaw gain, and L represents the vehicle wheelbase. In a preferred embodiment in which the recursive algorithm repeats with multiple iterations, one or more different intermediate values of yaw gain are calculated in each iteration of step 312, until a final yaw gain value is calculated in a final iteration of step 312, using the final values of turn radius and the adjustment factor from the final iterations of steps 306 and 308, respectively.

The process also includes determining a road wheel angle for the vehicle (step 314). In a preferred embodiment, the road wheel angle is derived from an angle or position of the hand wheel, such as the hand wheel angle 104 of FIG. 1. The road wheel angle is then used, along with the yaw gain and the vehicle speed, in calculating a desired lateral acceleration value (step 316), in accordance with Equation 11 below:

$$a_{yd} = \Omega_g \times \delta \times V_{ref} \quad \text{(Equation 11)}$$

In Equation 11, $a_{yd}$ represents the new lateral acceleration value, and δ represents the road wheel angle.

The lateral acceleration value is then used, along with a filtering constant, to determine a new desired lateral acceleration value (step 318), using Equation 12 below:

$$a_{yd}^* = a_{yd} + g \times (a_{yd}^* - a_{yd}) \quad \text{(Equation 12)}$$

In Equation 12, $a_{yd}^*$ represents the new desired lateral acceleration value, and g represents the filtering constant which controls the rate of convergence. In a preferred embodiment, steps 303-318 repeat in multiple iterations until the desired lateral acceleration values converge at least to a predetermined extent. Specifically, in a preferred embodiment, such convergence is attained when the difference between the new desired lateral acceleration value ($a_{yd}^*$) calculated in a current iteration and the desired lateral acceleration value ($a_{yd}$) calculated in an immediately prior iteration is less than a predetermined epsilon value (or, alternatively stated in accordance with Equation 12 above, when the difference between the new lateral acceleration value ($a_y$) calculated in a current iteration and the desired lateral acceleration value ($a_{yd}$) calculated in an immediately prior iteration is less than the predetermined epsilon value). Following such convergence of the lateral acceleration values, the yaw gain from the most recent, or final, iteration of step 312 (referred to above as the final yaw gain value) can then be used in the steering control process 200 of FIG. 2 to control one or more vehicle steering actions. For example, in one preferred embodiment, the yaw gain can then be used in an electronic stability control system to help control steering in appropriate situations, such as when the vehicle is in a skid. In other embodiments, convergence of one or more other variables, such as yaw gain and/or desired yaw rate, may be utilized, instead of the above-described convergence of lateral acceleration.

Figure 4:
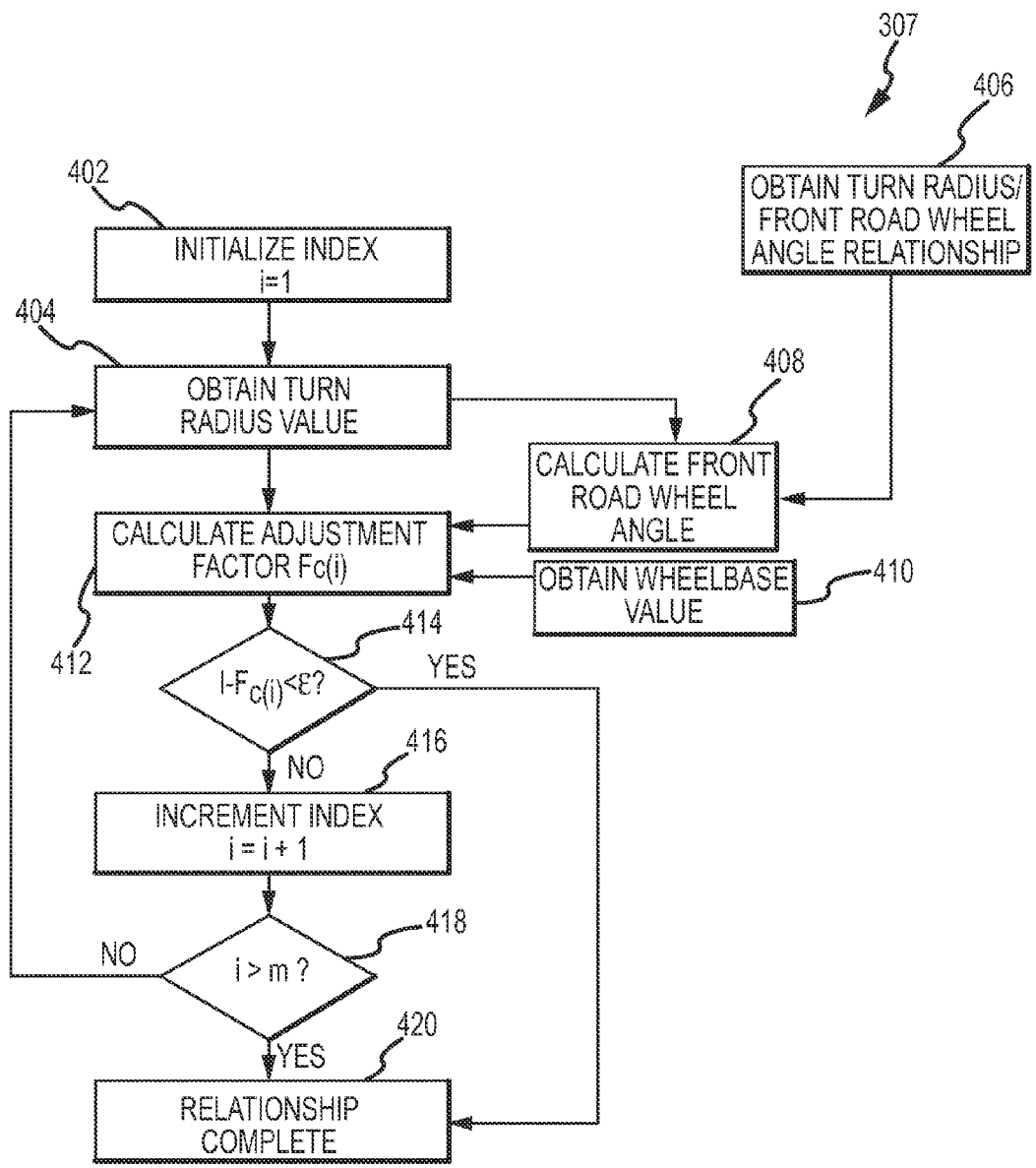
FIG. 4 is a flowchart of a process for generating a relationship between an adjustment factor for a baseline steering geometry equation and a turn radius of a vehicle, which can then be stored in a memory of a computer system in the steering control system of FIG. 1 and subsequently utilized in the process of FIG. 3, in accordance with an exemplary embodiment of the present invention.

FIG. 4 is a flowchart of an adjustment factor/turn radius relationship generating process 400 for generating a relationship between an adjustment factor for a baseline steering geometry equation and a turn radius of the vehicle, in accordance with an exemplary embodiment of the present invention. As described above, the relationship between the adjustment factor and the turn radius of the vehicle can be stored in the memory 128 of the computer system 114 of FIG. 1 and subsequently accessed in step 307 of the yaw gain calculation process 208 of FIG. 3, for use in calculating the yaw gain. In a preferred embodiment, the adjustment factor pertains to an adjustment to the baseline steering geometry Equation 1 as described above.

As depicted in FIG. 4, the adjustment factor/turn radius relationship generating process 400 begins with the step of initializing an index (step 402). In the depicted embodiment, the index (i) is initialized with a value equal to one. As will be discussed further below, a turn radius and an adjustment factor will be determined for each index value, to thereby develop a relationship between turn radius and the adjustment factor.

After the index is initialized, a turn radius is then obtained (step 404). In a preferred embodiment, the turn radius is obtained through manipulations of the hand wheel of the vehicle referenced above in connection with FIG. 1. As will be described in greater detail further below, step 404 is performed multiple times, with each iteration generating a turn radius value, so that a corresponding adjustment factor is calculated for each such turn radius value, in order to generate the desired relationship between turn radius and the adjustment factor. In a preferred embodiment, each turn radius value is generated by movement of a vehicle hand wheel by an operator of the vehicle, for example during vehicle manufacturing or testing. Also as will be described further below in connection with FIG. 5, in a preferred embodiment the values are logarithmically spaced.

A relationship between turn radius and front road wheel angle also is obtained (step 406). In a preferred embodiment, the relationship between turn radius and front road wheel angle is determined prior to the execution of the adjustment factor/turn radius relationship generating process, is saved in the memory 128 of the computer system 114 of FIG. 1 in the form of a polynomial or a look-up table, and is then retrieved from the memory 128 in step 406. An exemplary embodiment of a process for generating the relationship between turn radius and front road wheel angle (which is preferably conducted prior to the beginning of the adjustment factor/turn radius relationship generating process 400) will be described further below in connection with FIG. 5. It will be appreciated that, in various embodiments, steps 404 and 406, and various other steps described herein, may be performed simultaneously or in a different order than depicted in FIG. 4 or described herein.

A front road wheel angle is then calculated, based on the vehicle's current turn radius and the relationship between turn radius and front road wheel angle (step 408). In a preferred embodiment, this calculation, and the various other determinations and calculations described herein, are performed by the processor 126 of the computer system 114 of FIG. 1. In addition, a wheelbase is obtained for the vehicle (step 410). In a preferred embodiment, the wheelbase is obtained from the memory 128 of the computer system 114 of FIG. 1.

An adjustment factor is then calculated for the current index value (step 412), using the vehicle's current turn radius, the front road wheel angle, and the wheelbase, in accordance with Equation 13 below:

$$F_{c(i)} = R_{(i)} \delta_{(i)} / L \quad \text{(Equation 13)},$$

which is derived from Equation 5 set forth above. In Equation 13, $F_{c(i)}$ represents the adjustment factor for the current index value (i), $R_{(i)}$ represents a turn radius for the current index value (i), and L represents the wheelbase for the vehicle. The adjustment factor for the current index value is then correlated with the turn radius for the index value, for use as a data point in generating a table, a formula, or another type of relationship between turn radius and the adjustment factor.

Next, a determination is made as to whether the adjustment factor for the index value is approximately equal to one (step 414). In the depicted embodiment, this determination is made by subtracting the adjustment factor for the index value from one, and then comparing this difference with a predetermined epsilon value. In one preferred embodiment, the predetermined epsilon value is equal to 0.999; however, this may vary in other embodiments.

If it is determined that the adjustment factor for the index value is not approximately equal to one (i.e., if $1 - F_{c(i)} \geq \epsilon$ for a particular value of epsilon (ε)), then the index is incremented by one (step 416), and a determination is made as to whether each of the index values have been considered (step 418). In the depicted embodiment, there are "m" index values, and therefore step 418 comprises a determination as to whether the current, incremented index value (i) is greater than "m". In this embodiment, "m" is equal to the total number of turn radius values to be generated. For example, in one preferred embodiment, a value of "m" equal to twenty represents that twenty turn radius values are to be generated; however, this number may vary in different embodiments.

If it is determined that the index value (i) is greater than "m", then the relationship is determined to be complete (step 420). Conversely, if it is determined that the index value (i) is less than or equal to "m", then steps 404-418 repeat until it is determined that the index value is greater than "m", at which point the relationship is deemed to be complete (step 420). Specifically, in a preferred embodiment, the relationships between turn radius and the corresponding adjustment factor for each index value are incorporated into a table, or formula, and/or some other type of overall relationship between the turn radius and the adjustment factor.

Conversely, if it is determined that the adjustment factor for the index value is approximately equal to one (i.e., if $1-F_{c(i)} < \epsilon$ for a particular value of epsilon ($\epsilon$)), then the adjustment factor is considered to be relatively negligible, and therefore the relationship is deemed at that point to be complete (step 420). Accordingly, the relationships between the turn radius and a corresponding adjustment factor for each index value are incorporated into a table, or formula, and/or some other relationship between the turn radius and the adjustment factor. Also in a preferred embodiment, this relationship is stored in the memory 128 of the computer system 114 of FIG. 1, for subsequent use in the yaw gain calculation process 208 of FIG. 3.

Figure 5:
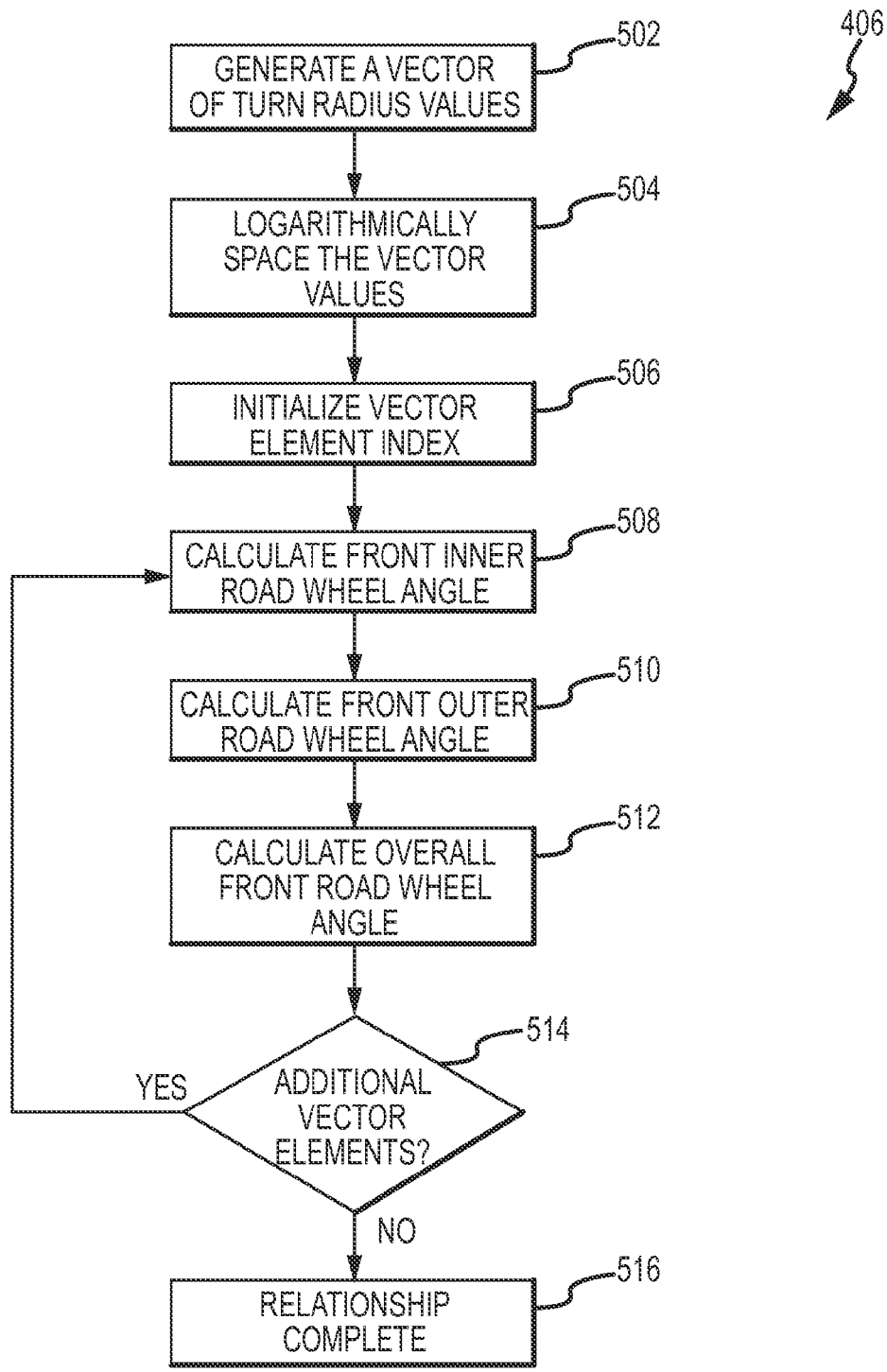
FIG. 5 is a flowchart of a process for determining a relationship between a turn radius and a front road wheel angle of a vehicle, which can then be stored in a memory of a computer system in the steering control system of FIG. 1 and subsequently utilized in the process of FIG. 4, in accordance with an exemplary embodiment of the present invention.

FIG. 5 is a flowchart of a turn radius/front road wheel angle relationship generating process 500 for generating a relationship between a turn radius and a front road wheel angle in a vehicle, in accordance with an exemplary embodiment of the present invention. As described above, the relationship between the turn radius and the front road wheel angle of the vehicle can then be stored in the memory 128 of the computer system 114 of FIG. 1 and subsequently retrieved in step 406 of the adjustment factor/turn radius relationship generating process 400.

As shown in FIG. 5, the turn radius/front road wheel angle relationship generating process 500 begins with the step of generating a turn radius vector for the vehicle (step 504). The first element of this vector is the minimum turn radius of the vehicle, from vehicle design data or determined experimentally. The last element of this vector is a large turn radius. Intermediate values are typically logarithmically spaced. A corresponding front road wheel angle is calculated for each such turn radius value, in order to generate the desired relationship between turn radius and front road wheel angle.

Next, a front inner road wheel angle is calculated (step 506). In addition, a front outer road wheel angle is also calculated (step 508). These calculations, and the various other determinations and calculations described herein, are conducted by the processor 126 of the computer system 114 of FIG. 1, in a preferred embodiment. It will be appreciated that steps 506 and 508, and various other steps described herein, may be performed simultaneously or in a different order than depicted in FIG. 5 or described herein.

Figure 6:
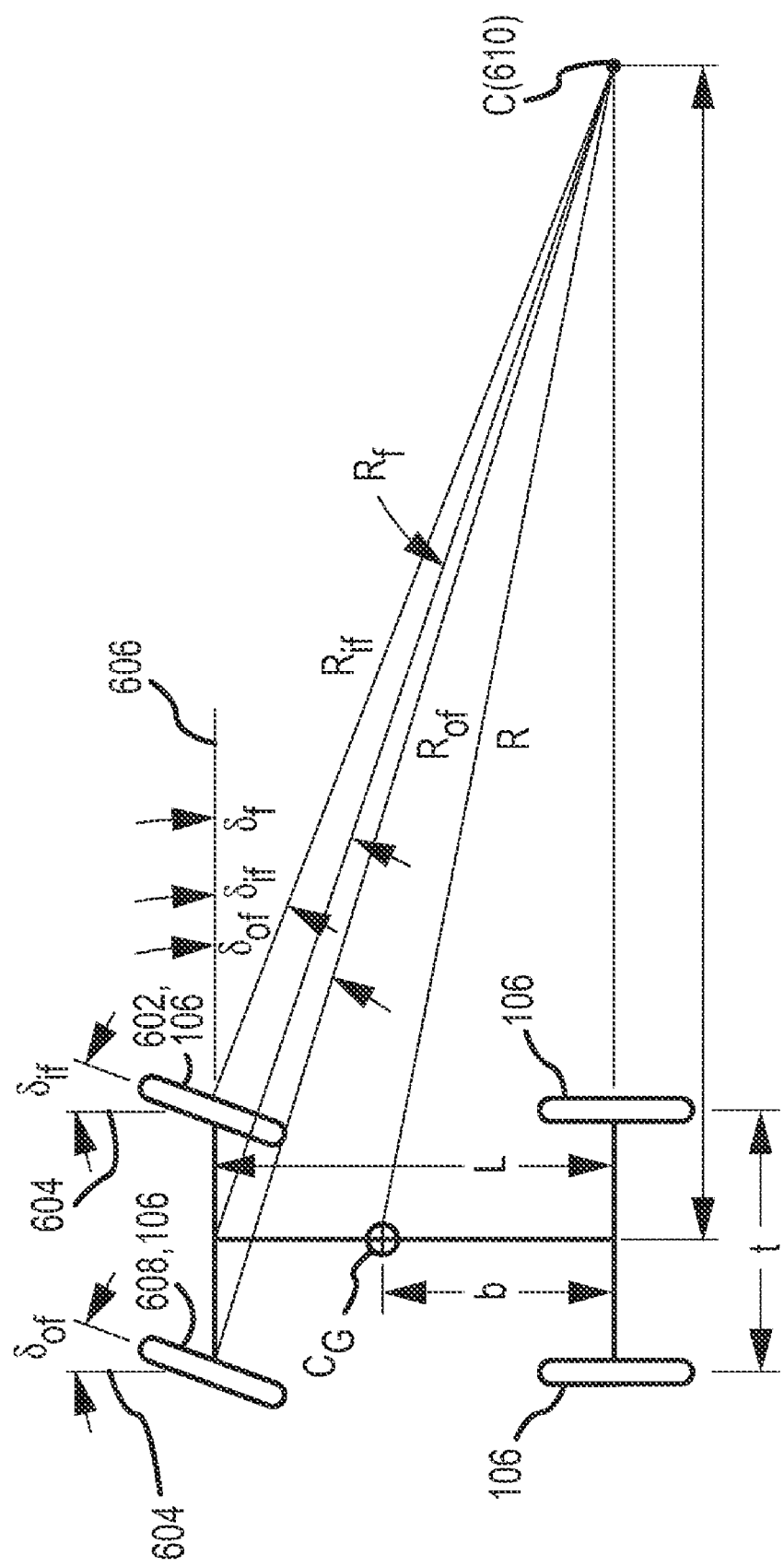
FIG. 6 is a simplified top view of a road wheel assembly with a plurality of road wheels in a vehicle shown during a turn, including an inner front road wheel and an outer front road wheel, and depicting a front inner road wheel angle, a front outer road wheel angle, and an overall front road wheel angle formed by the inner and outer front wheels during the turn, in accordance with an exemplary embodiment of the present invention.

As shown in FIG. 6 (depicting a road wheel assembly 600 with four road wheels 601 during a current vehicle turn), the front inner road wheel angle ($\delta_{if}$) can be defined as an angle formed by an inner road front road wheel 602 and a reference line 604 that is perpendicular to a front axle 606 connecting the inner front road wheel 602 with an outer front road wheel 608. Similarly, the front outer road wheel angle ($\delta_{of}$) can be defined as an angle formed by the outer road front road wheel 608 and the reference line 604. The inner front road wheel 602 is defined as the front road wheel that is closer to a center C (610) or axis of the current vehicle turn, and that therefore travels a smaller distance, as compared with the other front road wheel, during the current vehicle turn). Conversely, the outer front road wheel 608 is defined as the front road wheel that is further away from the center C (610) or axis of the current vehicle turn, and that therefore travels a greater distance, as compared with the other front road wheel, during the current vehicle turn).

Returning now to FIG. 5, in a preferred embodiment, both the front inner and outer road wheel angles are calculated using an arctangent function that incorporates a vehicle turn radius, a wheel base value of the vehicle, a distance from a center of gravity of the vehicle to a rear axle of the vehicle, and a vehicle front track width. However, this may vary in other embodiments. In one exemplary embodiment, the front inner road wheel angle is calculated (step 508) using Equation 14 below, and the front outer road wheel angle is calculated (step 510) using Equation 15 below:

$$\delta_{if} = \tan^{-1}[L/(\sqrt{R^2-b^2}-t/2)] \quad \text{(Equation 14)}$$

$$\delta_{of} = \tan^{-1}[L/(\sqrt{R^2-b^2}+t/2)] \quad \text{(Equation 15)}$$

In Equations 14 and 15, $\delta_{if}$ represents the front inner road wheel angle, $\delta_{of}$ represents the front outer road wheel angle, L represents the vehicle wheelbase, R represents the vehicle turn radius, b represents the distance from the center of gravity of the vehicle to a rear axle of the vehicle, and t represents the vehicle front track width.

The front inner and outer road wheel angles are then used to calculate an overall front road wheel angle ($\delta_f$) for the vehicle (step 512). The overall front road wheel angle ($\delta_f$) is defined as an overall effective angle of the front road wheels as it effects vehicle steering. As shown in FIG. 6, the overall front road wheel angle ($\delta_f$) has a value that is somewhere between the respective values of the front inner road wheel angle ($\delta_{if}$) and the front outer road wheel angle ($\delta_{of}$).

Returning again to FIG. 5, in a preferred embodiment, the overall front road wheel angle is also calculated using an arctangent function. However, this may also vary in other embodiments. In one exemplary embodiment, the overall front road wheel angle is calculated in accordance with Equation 16 below:

$$\delta_f = \tan^{-1}[(2 \times \tan \delta_{if} \times \tan \delta_{of})/(\tan \delta_{if} + \tan \delta_{of})] \quad \text{(Equation 16)},$$

in which $\delta_f$ represents the overall front road wheel angle of the vehicle.

After the overall front road wheel angle is calculated, a determination is made as to whether there are any additional hand wheel positions to be implemented (step 514). If it is determined that there are one or more additional hand wheel positions to be implemented, then the process returns to step 508, and a new turn radius vector element is selected. Subsequently, a new corresponding front inner road wheel, front outer road wheel, and overall front road wheel angles are calculated through a new iteration of steps 508-512, after which a determination is made in a new iteration of step 514 as to whether there are any additional hand wheel positions to be implemented. Steps 508-512 repeat in this manner through various iterations until a determination is made in an iteration of step 514 as to whether there are any additional hand wheel positions to be implemented. Once it is determined that there are no additional hand wheel positions to be implemented, the relationship is deemed to be complete (step 516).

Specifically, a corresponding overall front road wheel angle is calculated for each turn radius value, and thus a relationship is developed correlating turn radius and overall front road wheel angle. In a preferred embodiment, such values are used as data points and incorporated into a table, a formula, and/or another type of relationship that can be stored in the memory 128 of the computer system 114 of FIG. 1, and that can then be accessed in the steering control process 200 and the yaw gain calculation process 208 described above in connection with FIGS. 2 and 3, respectively. In addition, in one preferred embodiment, each of the turn radius values are logarithmically spaced in one or more turn radius vectors, for example during the various iterations of step 504.

Accordingly, an improved system for calculating a yaw gain for use in controlling a vehicle is provided. An improved program product is also provided for use in such an improved system. In addition, improved methods are provided for calculating a yaw gain for use in controlling a vehicle. The improved system, program product, and methods allow for improved determination of yaw gain for use in controlling a vehicle, even in situations when the turn radius is not significantly larger than the wheelbase, for example during tight turning maneuvers. This results in enhanced stability control and an improved driving experience.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for calculating a yaw gain for use in controlling a vehicle, the method comprising the steps of:
    obtaining a turn radius of the vehicle;
    obtaining a vehicle speed;
    calculating an adjustment factor for a baseline steering geometry equation, based at least in part on the turn radius; and
    calculating the yaw gain based at least in part on the turn radius, the vehicle speed, and the adjustment factor.

2. The method of claim 1, further comprising the step of: controlling a vehicle action using the yaw gain.

3. The method of claim 1, further comprising the steps of:
    determining a road wheel angle of the vehicle; and
    calculating a yaw rate by multiplying the yaw gain by the road wheel angle.

4. The method of claim 3, wherein the step of determining a road wheel angle of the vehicle comprises the steps of:
    generating a function correlating road wheel angle and turn radius of the vehicle; and
    determining the road wheel angle based at least in part on the turn radius and the function correlating road wheel angle and turn radius.

5. The method of claim 4, wherein the step of generating the function correlating road wheel angle and turn radius comprises the steps of:
    generating a plurality of turn radius values;
    calculating a front inner road wheel angle for each of the plurality of turn radius values;
    calculating a front outer road wheel angle for each of the plurality of turn radius values; and
    calculating an overall front road wheel angle for each of the plurality of turn radius values, based at least in part on the front inner road wheel angle and the front outer road wheel angle for each of the plurality of turn radius values.

6. The method of claim 1, further comprising the step of:
    determining an understeer gradient of the vehicle;
    wherein the yaw gain is calculated also based at least in part on the understeer gradient.

7. The method of claim 1, further comprising the step of:
    determining a lateral acceleration using a sequence of recursive steps;
    wherein the yaw gain is calculated also based at least in part on the lateral acceleration.

8. The method of claim 7, wherein the sequence of recursive steps comprises the steps of:
    selecting an initial value of lateral acceleration;
    calculating an understeer gradient of the vehicle based at least in part on the initial value of lateral acceleration;
    calculating an intermediate value of turn radius based at least in part on the vehicle speed and the initial value of lateral acceleration;
    calculating an intermediate value for the adjustment factor based at least in part on the intermediate value of turn radius;
    obtaining a wheelbase of the vehicle;
    calculating an intermediate value of yaw gain based at least in part on the vehicle speed, the intermediate value for the adjustment factor, the wheelbase, and the understeer gradient;
    determining a road wheel angle of the vehicle; and
    calculating a new value of lateral acceleration, based at least in part on the initial value of lateral acceleration, the intermediate value of yaw gain, the vehicle speed, and the road wheel angle.

9. The method of claim 8, wherein the initial value of lateral acceleration is selected based at least in part on a maximum lateral acceleration capability of the vehicle on dry pavement.

10. A program product for calculating a yaw gain for use in controlling a vehicle, the program product comprising:
    a program configured to at least facilitate:
        obtaining a turn radius of the vehicle;
        obtaining a vehicle speed;
        determining an adjustment factor for a baseline steering geometry equation, based at least in part on the turn radius; and
        calculating the yaw gain based at least in part on the turn radius, the vehicle speed, and the adjustment factor; and
    a non-transitory computer-readable signal-bearing media bearing the program.

11. The program product of claim 10, wherein the program is further configured to at least facilitate:
    determining a road wheel angle of the vehicle; and
    calculating a yaw rate by multiplying the yaw gain by the road wheel angle.

12. The program product of claim 11, wherein the program is further configured to at least facilitate:
    generating a function correlating road wheel angle and turn radius of the vehicle; and
    determining the road wheel angle based at least in part on the turn radius and the function correlating road wheel angle and turn radius.

13. The program product of claim 12, wherein the program is further configured to at least facilitate generating the function correlating road wheel angle and turn radius by at least facilitating the following:
    generating a plurality of turn radius values;

calculating a front inner road wheel angle for each of the plurality of turn radius values;
calculating a front outer road wheel angle for each of the plurality of turn radius values; and
calculating an overall front road wheel angle for each of the plurality of turn radius values, based at least in part on the front inner road wheel angle and the front outer road wheel angle for each of the plurality of turn radius values.

14. The program product of claim 10, wherein the program is further configured to at least facilitate:
determining a lateral acceleration using a sequence of recursive steps;
wherein the yaw gain is calculated also based at least in part on the lateral acceleration.

15. The program product of claim 14, wherein the sequence of recursive steps comprises:
selecting an initial value of lateral acceleration;
calculating an understeer gradient of the vehicle based at least in part on the initial value of lateral acceleration;
calculating an intermediate value of turn radius based at least in part on the vehicle speed and the initial value of lateral acceleration;
calculating an intermediate value for the adjustment factor based at least in part on the intermediate value of turn radius;
obtaining a wheelbase of the vehicle;
calculating an intermediate value of yaw gain based at least in part on the vehicle speed, the intermediate value for the adjustment factor, the wheelbase, and the understeer gradient;
determining a road wheel angle of the vehicle; and
calculating a new value of lateral acceleration, based at least in part on the initial value of lateral acceleration, the intermediate value of yaw gain, the vehicle speed, and the road wheel angle.

16. A system for controlling a steering action of a vehicle, the system comprising:
a first sensing device configured to sense a first value used to at least facilitate determining a turn radius of the vehicle;
a second sensing device configured to sense a second value used to at least facilitate determining a vehicle speed of the vehicle; and
a processor configured to at least facilitate:
determining an adjustment factor for a baseline steering geometry equation, based at least in part on the turn radius;
calculating a yaw gain based at least in part on the turn radius, the vehicle speed, and the adjustment factor; and
controlling the steering action using the yaw gain.

17. The system of claim 16, wherein the processor is further configured to at least facilitate:
determining a road wheel angle of the vehicle; and
calculating a yaw rate by multiplying the yaw gain by the road wheel angle.

18. The system of claim 17, wherein the processor is further configured to at least facilitate:
generating a function correlating road wheel angle and turn radius of the vehicle; and
determining the road wheel angle based at least in part on the turn radius and the function correlating road wheel angle and turn radius.

19. The system of claim 16, wherein the processor is further configured to at least facilitate:
determining a lateral acceleration using a sequence of recursive steps;
wherein the yaw gain is calculated also based at least in part on the lateral acceleration.

20. The system of claim 19, wherein the sequence of recursive steps comprises:
selecting an initial value of lateral acceleration;
calculating an understeer gradient of the vehicle based at least in part on the initial value of lateral acceleration;
calculating an intermediate value of turn radius based at least in part on the vehicle speed and the initial value of lateral acceleration;
calculating an intermediate value for the adjustment factor based at least in part on the intermediate value of turn radius;
obtaining a wheelbase of the vehicle;
calculating an intermediate value of yaw gain based at least in part on the vehicle speed, the intermediate value for the adjustment factor, the wheelbase, and the understeer gradient;
determining a road wheel angle of the vehicle; and
calculating a new value of lateral acceleration, based at least in part on the initial value of lateral acceleration, the intermediate value of yaw gain, the vehicle speed, and the road wheel angle.

* * * * *